US011514892B2

(12) United States Patent
Samn et al.

(10) Patent No.: US 11,514,892 B2
(45) Date of Patent: Nov. 29, 2022

(54) AUDIO-SPECTRAL-MASKING-DEEP-NEURAL-NETWORK CROWD SEARCH

(71) Applicant: INTERNATIONAL BUSINESS MACHINES CORPORATION, Armonk, NY (US)

(72) Inventors: Jonathan Samn, Austin, TX (US); Poojitha Bikki, Austin, TX (US); Jeb R. Linton, Manassas, VA (US); Minsik Lee, Fort Lee, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 16/823,725

(22) Filed: Mar. 19, 2020

(65) Prior Publication Data

US 2021/0295828 A1   Sep. 23, 2021

(51) Int. Cl.
| | | |
|---|---|---|
| *G10L 15/16* | (2006.01) | |
| *G06N 3/04* | (2006.01) | |
| *G10L 15/32* | (2013.01) | |
| *G10L 15/30* | (2013.01) | |

(52) U.S. Cl.
CPC ............ *G10L 15/16* (2013.01); *G06N 3/0454* (2013.01); *G10L 15/30* (2013.01); *G10L 15/32* (2013.01)

(58) Field of Classification Search
CPC ......... G10L 15/16; G10L 15/30; G10L 15/32; G10L 2021/02087; G10L 21/0208; G10L 25/30; G10L 25/51; G06F 3/167; G06N 3/0454; G06N 3/063; G06N 3/08
See application file for complete search history.

(56) References Cited

U.S. PATENT DOCUMENTS

| | | |
|---|---|---|
| 5,901,232 A | 5/1999 | Gibbs |
| 6,254,159 B1 | 7/2001 | Wieczorek et al. |
| 6,967,455 B2 * | 11/2005 | Nakadai .................. B25J 13/00 318/568.13 |
| 7,039,199 B2 | 5/2006 | Rui |

(Continued)

OTHER PUBLICATIONS

Lyon, "A Computational Model of Binaural Localization and Separation," ICASSP 83, Boston, pp. 1148-1151.

(Continued)

*Primary Examiner* — Abdelali Serrou
(74) *Attorney, Agent, or Firm* — Conley Rose, P.C.

(57) ABSTRACT

A system includes a memory having instructions therein and at least one processor in communication with the memory. The at least one processor is configured to execute the instructions to communicate, into a user device, a deep neural network comprising a predictive audio spectral mask. The at least one processor is also configured to execute the instructions to: generate data corresponding to ambient sound via a multi-microphone device; separate amplitude data and/or phase data from the data via the deep neural network comprising the predictive audio spectral mask; and determine, via the user device and based on the amplitude data and/or phase data, a location of origin of target speech relative to the user device. The at least one processor is configured to execute the instructions to display, via the user device, the location of origin of the target speech relative to the user device.

19 Claims, 3 Drawing Sheets

(56) References Cited

U.S. PATENT DOCUMENTS

| | | | |
|---|---|---|---|
| 8,085,949 B2* | 12/2011 | Kim | G10L 21/0208 381/94.1 |
| 8,660,815 B2 | 2/2014 | Lavache | |
| 8,762,137 B2* | 6/2014 | Fukuda | G10L 15/20 704/225 |
| 9,666,183 B2* | 5/2017 | Visser | G10L 25/30 |
| 9,947,364 B2* | 4/2018 | Kanevsky | H04M 3/56 |
| 10,210,756 B2* | 2/2019 | Arunachalam | G08G 1/0965 |
| 10,433,051 B2 | 10/2019 | Usher | |
| 2003/0004729 A1 | 1/2003 | Allen et al. | |
| 2003/0185410 A1* | 10/2003 | June | H04R 1/406 381/94.1 |
| 2004/0037436 A1* | 2/2004 | Rui | H04R 3/005 381/92 |
| 2014/0348333 A1* | 11/2014 | Fallat | G10K 11/16 381/56 |
| 2016/0267924 A1* | 9/2016 | Terao | G10L 25/51 |
| 2018/0068675 A1* | 3/2018 | Variani | G10L 19/008 |
| 2018/0343517 A1* | 11/2018 | Usher | H04R 3/005 |
| 2018/0374487 A1* | 12/2018 | Lesso | G10L 17/26 |
| 2019/0115041 A1* | 4/2019 | Jensen | H04R 25/407 |
| 2019/0236416 A1 | 8/2019 | Wang et al. | |
| 2019/0318757 A1* | 10/2019 | Chen | G06N 3/08 |
| 2020/0051566 A1* | 2/2020 | Shin | G10L 15/22 |

OTHER PUBLICATIONS

Khoury, et al., "SPEAR: An Open Source Toolbox for Speaker Recognition Based on Bob," ICASSP 2014, 2014 (39th) IEEE International Conference on Acoustics, Speech and Signal Processing, presented between May 4-9, 2014, Florence, Italy,added to IEEE Xplore Jul. 14, 2014, published in Processing (ICASSP), published in Proceedings of the 39th IEEE International Conference on Acoustics, Speech and Signal Processing, EPFL-CONF-196984, pp. 1655-1659 (https://idiap.ch.solftware/bob/docs/bob.5 pages.

Subramanian, et al., "Student-Teacher Learning for BLSTM Mask-based Speech Enhancement," arXiv: 1803.10013v1 [33ss.AS], Mar. 27, 2018, 5 pages.

Wang, et al., "On Training Targets for Supervised Speech Separation," IEEE/ACM Trans Audio Speech Lang Process. Dec. 2014 ; 22(12): 1849-1858. doi:10.1109/TASLP.2014.2352935, 28 pages.

Wang, "Time-Frequency Masking for Speech Separation and Its Potential for Hearing Aid Design," Trends in Amplification, vol. 12 No. 4 Dec. 2008 pp. 332-353 © 2008 SAGE Publications, 10.1177/1084713808326455 http://tia.sagepub.com hosted at http://online.sagepub.com.

Wang, et al., "Supervised Speech Separation Based on Deep Learning: An Overview," https://arxiv.org/abs/1708.07524v2, arXiv:1708.07524v2 [cs.CL], Feb. 3, 2020, revised Jun. 15, 2018, 28 pages.

"SPEAR: A Speaker Recognition Toolkit Based on Bob," 3.2.4 Documentation, 2 pages.

* cited by examiner

AUDIO-SPECTRAL-MASKING-DEEP-NEURAL-NETWORK CROWD SEARCH

BACKGROUND

The present disclosure relates generally to the field of audio signal processing and, more particularly, to isolating and identifying voice data from an ambient sound field.

One or more parents may wish to find one or more children who become lost in a crowded place. One or more persons may wish to find and join one or more other persons at a cocktail party, outdoor concert, or other crowded event. In any event, there may be various reasons why one or more persons may wish to find one or more other persons in a crowd.

Meanwhile, various abilities of machines to acquire and apply knowledge and skills have been categorized as artificial intelligence ("AI"). Machine learning has been considered to be a form of AI. Machine learning has employed algorithms and statistical models that have enabled computer systems to perform tasks based primarily on data patterns and associated inferences rather than explicit instructions. Some machine learning systems have comprised deep neural networks. Some deep neural networks can provide predictive audio spectral masks that may facilitate separation of individual voices from crowd noise or other ambient sound.

SUMMARY

A method is disclosed. The method includes communicating, into a first user device, a first deep neural network comprising a first predictive audio spectral mask. The method also includes generating, via a first multi-microphone device comprising a first plurality of microphones, first data corresponding to ambient sound. The method also includes receiving, via the first user device, the first data from the first multi-microphone device. The method also includes separating, from the first data, via the first deep neural network comprising the first predictive audio spectral mask in the first user device, at least one component of the first data selected from the group consisting of amplitude data corresponding to a first amplitude component of the ambient sound sensed at a first microphone of the first multi-microphone device and phase data corresponding to a first phase component of the ambient sound sensed at the first microphone of the first multi-microphone device. The method also includes determining, via the first user device and based on the at least one component of the first data, a location of origin of first target speech relative to a location of the first user device. The method also includes displaying, via the first user device, the location of origin of the first target speech relative to the first user device.

A system is also disclosed. The system includes a memory having instructions therein and at least one processor in communication with the memory. The at least one processor is configured to execute the instructions to communicate, into a first user device, a first deep neural network comprising a first predictive audio spectral mask. The at least one processor is also configured to execute the instructions to generate, via a first multi-microphone device comprising a first plurality of microphones, first data corresponding to ambient sound. The at least one processor is also configured to execute the instructions to receive, via the first user device, the first data from the first multi-microphone device. The at least one processor is also configured to execute the instructions to separate, from the first data, via the first deep neural network comprising the first predictive audio spectral mask in the first user device, at least one component of the first data selected from the group consisting of amplitude data corresponding to a first amplitude component of the ambient sound sensed at a first microphone of the first multi-microphone device and phase data corresponding to a first phase component of the ambient sound sensed at the first microphone of the first multi-microphone device. The at least one processor is also configured to execute the instructions to determine, via the first user device and based on the at least one component of the first data, a location of origin of first target speech relative to a location of the first user device. The at least one processor is also configured to execute the instructions to display, via the first user device, the location of origin of the first target speech relative to the first user device.

A computer program product is also disclosed. The computer program product includes a computer readable storage medium having program instructions embodied therewith. The program instructions are executable by at least one processor to cause the at least one processor to communicate, into a first user device, a first deep neural network comprising a first predictive audio spectral mask. The program instructions are also executable by the at least one processor to cause the at least one processor to generate, via a first multi-microphone device comprising a first plurality of microphones, first data corresponding to ambient sound. The program instructions are also executable by the at least one processor to cause the at least one processor to receive, via the first user device, the first data from the first multi-microphone device. The program instructions are also executable by the at least one processor to cause the at least one processor to separate, from the first data, via the first deep neural network comprising the first predictive audio spectral mask in the first user device, at least one component of the first data selected from the group consisting of amplitude data corresponding to a first amplitude component of the ambient sound sensed at a first microphone of the first multi-microphone device and phase data corresponding to a first phase component of the ambient sound sensed at the first microphone of the first multi-microphone device. The program instructions are also executable by the at least one processor to cause the at least one processor to determine, via the first user device and based on the at least one component of the first data, a location of origin of first target speech relative to a location of the first user device. The program instructions are also executable by the at least one processor to cause the at least one processor to display, via the first user device, the location of origin of the first target speech relative to the first user device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
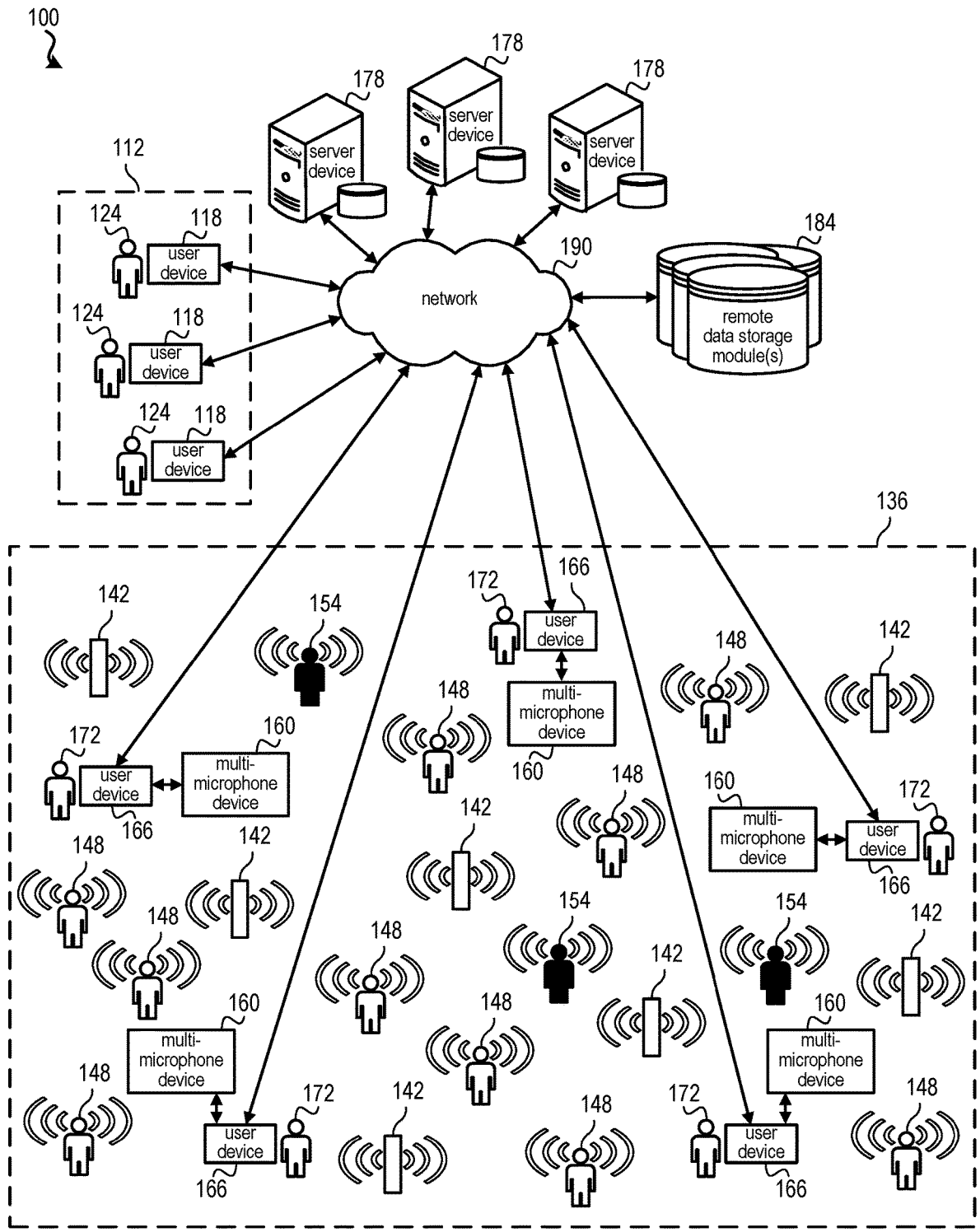
FIG. 1 is a block diagram illustration of a network environment in accordance with aspects of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some embodiments, aspects of the present disclosure provide a multi-microphone device combined with a deep neural network, trained to provide one or more audio spectral masks for separating corresponding target speech from crowd noise, which can identify a respective direction and/or location of one or more corresponding target speakers relative to the multi-microphone device. In some embodiments, the multi-microphone device may comprise a small hand held stand-alone device. In some embodiments, the multi-microphone device may be communicatively coupled to a smartphone. In some embodiments, suitable software may be factory-installed on the multi-microphone device. In some embodiments, a suitable mobile app (i.e., a computer program or software application designed to run on a mobile device) may be downloaded into the smartphone. In some embodiments, the factory-installed software and/or mobile app may provide for user selection of various different target speaker(s), and may cause the multi-microphone device and/or the smartphone, respectively, to display one or more indicators of the relative direction(s) and/or location(s) of the selected target speaker(s). In some embodiments, one or more deep neural networks comprising such audio spectral masks may be wirelessly copied from one or more smartphones to one or more other smartphones.

As used within the written disclosure and in the claims, the terms "including" and "comprising" (and inflections thereof) are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A "module" or "unit" (and inflections thereof) as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicate" (and inflections thereof) means to receive and/or transmit data or information over a communication link. The communication link may include both wired and wireless links, and may comprise a direct link or may comprise multiple links passing through one or more communication networks or network devices such as, but not limited to, routers, firewalls, servers, and switches. The communication networks may comprise any type of wired or wireless network. The networks may include private networks and/or public networks such as the Internet. Additionally, in some embodiments, the term communicate may also encompass internal communication between various components of a system and/or with an external input/output device such as a keyboard or display device.

Deep learning, also known as deep structured learning or hierarchical learning, is a form of machine learning based on artificial neural networks. As referenced herein, the term "deep neural network" (and inflections thereof) is intended to be construed according to the prevailing meaning in the art. For example, a deep neural network typically comprises an artificial neural network comprising multiple layers between its input layer of nodes and its output layer of nodes.

As referenced herein, the term "audio spectral mask" (and inflections thereof) is intended to be construed according to the prevailing meaning in the art. For example, an audio spectral mask typically comprises a mathematically-defined filter for audio data processing, which is configured to suitably correspond to one or more distinguishing features of anticipated target speech, such that the audio spectral mask will suitably attenuate or suitably filter out (from any given audio data) audio spectral components that do not suitably match the anticipated target speech. Further, as referenced herein, the term "predictive audio spectral mask" (and inflections thereof) means an audio spectral mask that may be configured according to a machine learning prediction that it will suitably match anticipated target speech. For example, in some embodiments a suitable predictive audio spectral mask may be produced by a time-series machine learning model that employs natural language processing and audio data processing techniques to predict next likely word sound sequences from a target speaker during a conversation and/or other frequency signatures of target speech—moment by moment [e.g., about once per millisecond]—as audio input data is processed.

FIG. 1 is a block diagram illustration of a network environment 100 in accordance with aspects of the present disclosure. The network environment 100 comprises a training environment 112, a field environment 136, one or more server devices 178, one or more remote data storage modules 184, and a network 190.

The training environment 112 comprises one or more training environment user devices 118 and one or more human trainers 124. Each of the one or more training environment user devices 118 is communicatively coupled to the network 190 and, thus, may be communicatively coupled (through or over the network 190) to each other and to whatever else is communicatively coupled to the network 190. Each of the one or more training environment user devices 118 comprises any type of device that allows the one or more human trainers 124 to audibly, textually, or otherwise suitably interact (through or over the network 190) with whatever may be communicatively coupled to the network 190. Non-limiting examples of one of the one or more training environment user devices 118 include a personal computer (desktop or laptop), a mobile device (e.g., personal digital assistant ("PDA"), smartphone, tablet, etc.), and a cognitive voice assistant device (e.g., Amazon's Alexa®, a Google Home® device, etc.). In some embodiments, the one or more training environment user devices 118 may comprise a corresponding one or more of a data processing system like the data processing system 300 (the data processing system 300 per se is not explicitly illustrated in FIG. 1, but see FIG. 3).

The field environment 136 comprises one or more non-human sound sources 142, one or more non-target human speakers 148, one or more target human speakers 154, one or more multi-microphone devices 160, one or more field environment user devices 166, and one or more human searchers 172. Each of the one or more multi-microphone devices 160 comprises two or more omnidirectional microphones, and is configured to generate composite audio data corresponding to whatever ambient sound is sensed by each of its microphones, such that the composite audio data comprises amplitude data and phase data corresponding ambient sound sensed at each microphone.

Each of the one or more field environment user devices 166 is communicatively coupled to a respective one of the one or more multi-microphone devices 160. Each of the one or more field environment user devices 166 is also communicatively coupled to the network 190 and, thus, may be communicatively coupled (through or over the network 190) to each other and to whatever else is communicatively coupled to the network 190. Each of the one or more field environment user devices 166 comprises any type of device that allows the one or more human searchers 172 to audibly, textually, or otherwise suitably interact (through or over the network 190) with whatever may be communicatively coupled to the network 190. Non-limiting examples of one of the one or more field environment user devices 166 include a personal computer (desktop or laptop), a mobile device (e.g., personal digital assistant ("PDA"), smartphone, tablet, etc.), and a cognitive voice assistant device (e.g., Amazon's Alexa®, a Google Home® device, etc.). In some embodiments, the one or more field environment user devices 166 may comprise a corresponding one or more of a data processing system like the data processing system 300 (the data processing system 300 per se is not explicitly illustrated in FIG. 1, but see FIG. 3).

Each of the one or more server devices 178 is communicatively coupled to the network 190 and, thus, may be communicatively coupled (through or over the network 190) to each other and to whatever else is communicatively coupled to the network 190. The one or more server devices 178 comprise a machine learning agent and any one or more devices that can (alone or in combination with one or more other components of the network environment 100) suitably implement a speech location process 200 in accordance with aspects of the present disclosure (the process 200 per se is not explicitly illustrated in FIG. 1, but see FIG. 2). In some embodiments, the one or more server devices 178 may comprise a corresponding one or more of a data processing system like the data processing system 300 (the data processing system 300 per se is not explicitly illustrated in FIG. 1, but see FIG. 3). In some embodiments, the one or more server devices 178 may comprise one or more suitable computers, machines, modules, and/or devices provided by an Internet service provider.

Each of the one or more remote data storage modules 184 is communicatively coupled to the network 190 and, thus, may be communicatively coupled (through or over the network 190) to each other and to whatever else is communicatively coupled to the network 190. The one or more remote data storage modules 184 are configured to (alone or in combination) store and provide access to various data that may be generated, modified, and/or used in accordance with aspects of the present disclosure. In some embodiments, the one or more remote data storage modules 184 may comprise a corresponding one or more of a data processing system like the data processing system 300 (the data processing system 300 per se is not explicitly illustrated in FIG. 1, but see FIG. 3). In some embodiments, the one or more remote data storage modules 184 may comprise one or more suitable computers, machines, modules, and/or devices provided by an Internet service provider.

The network 190 comprises any type of network that enables the one or more training environment user devices 118, the one or more field environment user devices 166, the one or more server devices 178, and the one or more remote data storage modules 184 to communicate with each other through or over the network 190. The network 190 may comprise one or more wired and/or wireless networks such as, but not limited to, one or more radio networks (e.g., cellular network or mobile network), one or more local area networks ("LANs"), one or more wide area networks ("WANs"), one or more metropolitan area networks ("MANs"), etc. The network 190 may also comprise one or more private networks and/or one or more public networks (such as, but not limited to, the Internet). In some embodiments, the network 190 may comprise a corresponding one or more of a data processing system like the data processing system 300 (the data processing system 300 per se is not explicitly illustrated in FIG. 1, but see FIG. 3). In some embodiments, the network 190 may comprise one or more suitable computers, machines, modules, and/or devices provided by an Internet service provider.

Figure 2:
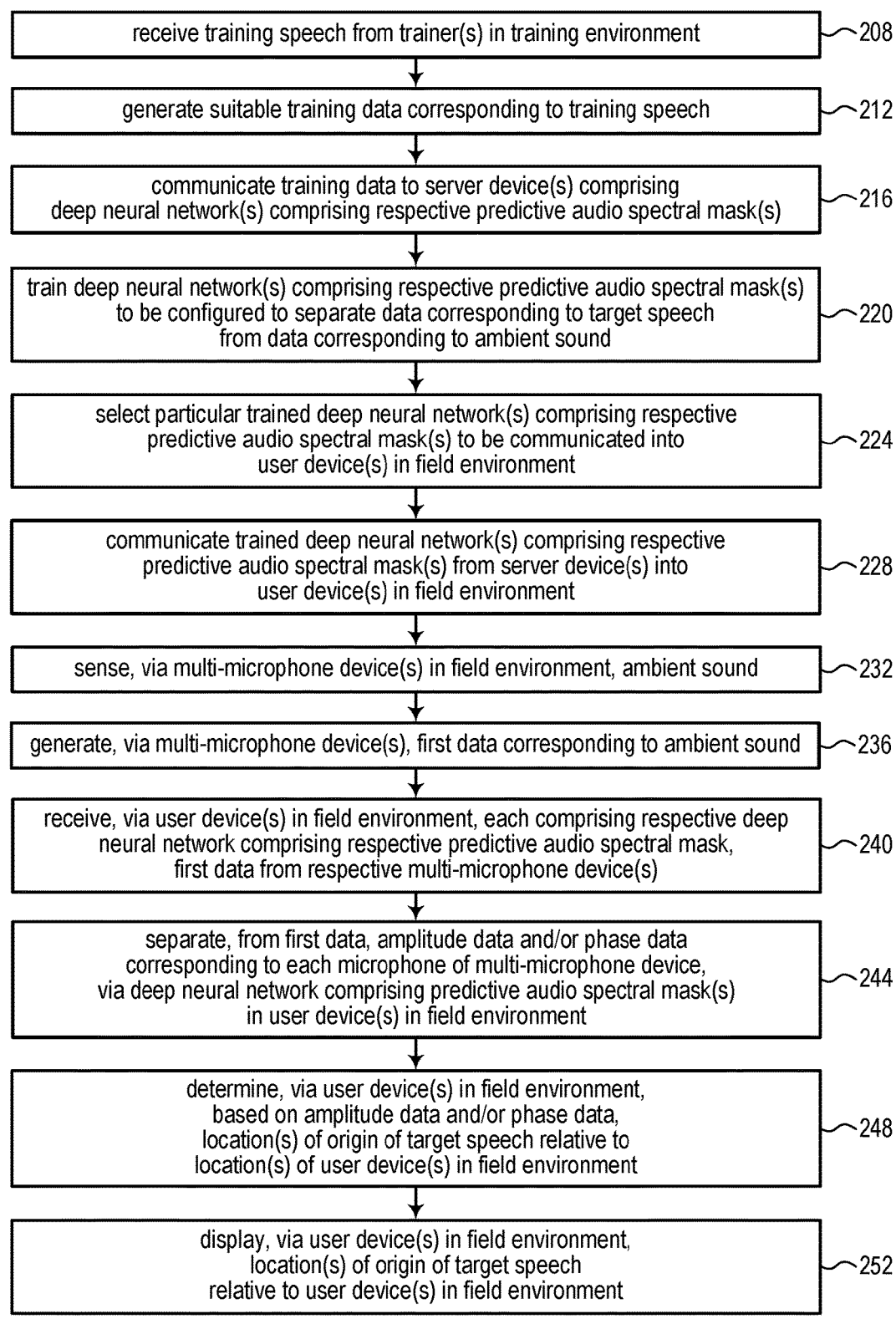
FIG. 2 is a flowchart illustration of a target speech location and tracking process in accordance with aspects of the present disclosure.

FIG. 2 is a flowchart illustration of the target speech location and tracking process 200. In some instances, one or more steps of the process 200 may be performed by the one or more server devices 178 and/or one or more of the other systems, components, methods, and/or processes described herein. For clarity of exposition, the following description(s) of the process 200 may refer to one or more of such systems, components, methods, and/or processes. Nevertheless, it should be appreciated that the process 200 and/or any one or more of its particular steps may be performed by any suitable system(s), component(s), method(s), and/or process(es). It should also be appreciated that the process 200 may be performed concurrently or substantially concurrently with any other method(s) and/or process(es) described herein.

At step 208, the process 200 receives training speech from one or more trainers in a training environment. The training speech comprises speech of suitable character and duration to generate (at step 212) corresponding training data suitable for training one or more respective deep neural networks to provide one or more respective predictive audio spectral masks. Accordingly, in some instances the one or more human trainers 124 may each suitably speak into a respective one of the one or more training environment user devices 118. From step 208, the process 200 goes to (and continues at) step 212.

At step 212, the process 200 generates training data, corresponding to the training speech (received at step 208), suitable for training one or more respective deep neural networks to provide one or more corresponding respective predictive audio spectral masks. Accordingly, in some instances the one or more training environment user devices 118 (that have received the training speech, at step 208) may generate such corresponding training data. From step 212, the process 200 goes to (and continues at) step 216.

At step 216, the process 200 communicates the training data (generated at step 212) to one or more server devices comprising one or more deep neural networks comprising one or more respective predictive audio spectral masks. Accordingly, in some instances the one or more server devices 178 may comprise the one or more deep neural networks comprising the one or more respective predictive audio spectral masks, and the one or more training environment user devices 118 (that have generated the training speech, at step 212) may communicate the training data (through or over the network 190) to the one or more server devices 178. From step 216, the process 200 goes to (and continues at) step 220.

At step 220, the process 200 trains the one or more deep neural networks comprising the respective predictive audio spectral masks to be configured to separate data corresponding to target speech from data corresponding to ambient sound. It should be appreciated that the target speech will be speech (sensed in a field environment, at step 232) that suitably matches distinguishing features of the training speech and, thus, may be used to biometrically identify the corresponding one or more human trainers 124 who uttered the training speech. Accordingly, in some instances the one or more server devices 178 may comprise the one or more deep neural networks comprising the one or more respective predictive audio spectral masks, and the one or more server devices 178 may use the training data (communicated at step 216) to so train the one or more deep neural networks comprising the respective predictive audio spectral masks. From step 220, the process 200 goes to (and continues at) step 224.

At step 224, the process 200 selects one or more of the deep neural networks (trained at step 220) comprising the respective predictive audio spectral masks to be communicated into one or more user devices in a field environment. It should be appreciated that these selected deep neural networks are, of those that have been trained (at step 220), the particular deep neural networks comprising the respective predictive audio spectral masks that are configured to biometrically identify particular corresponding one or more trainers who have moved into the field environment (and are to be located and/or tracked in the field environment). Accordingly, in some instances one or more of the one or more human searchers 172 may cause a respective one or more of the field environment user devices 166 to communicate to the one or more server devices 178 (through or over the network 190) one or more selections of one or more of the trained deep neural networks comprising the respective predictive audio spectral masks corresponding to one or more of the one or more human trainers 124 who have moved into the field environment 136 and are desired to be located and/or tracked (as one or more respective target human speakers 154). It should be appreciated that, in some embodiments, step 224 may comprise causing each and every one of two or more such trained deep neural networks comprising the respective predictive audio spectral masks to all be communicated into one or more user devices in the field environment and/or may comprise causing different ones of such trained deep neural networks comprising the respective predictive audio spectral masks to be communicated into respective different user devices in the field environment. Hence, in some instances one or more of the one or more human searchers 172 may then select between different persons to search for or may concurrently or simultaneously search for two or more persons. From step 224, the process 200 goes to (and continues at) step 228.

At step 228, the process 200 communicates, into the one or more user devices in the field environment, the one or more deep neural networks (selected at step 220) comprising the respective predictive audio spectral masks. Accordingly, in some instances the one or more server devices 178 may comprise the one or more selected deep neural networks comprising the one or more respective predictive audio spectral masks, and the one or more server devices 178 may communicate (through or over the network 190) a copy of each of the one or more selected deep neural networks comprising the respective predictive audio spectral masks into the one or more field environment user devices 166. In some embodiments, step 228 may comprise wireless sharing (communication through or over Bluetooth, Wi-Fi, or any other wireless communication link) of one or more copies of the trained deep neural networks comprising the respective predictive audio spectral masks from one or more of the user devices in the field environment to one or more other of the of the user devices in the field environment. From step 228, the process 200 goes to (and continues at) step 232.

At step 232, the process 200 senses ambient sound using one or more multi-microphone devices in a field environment. Accordingly, in some instances the one or more multi-microphone devices 160 may sense the ambient sound in the field environment 136. From step 232, the process 200 goes to (and continues at) step 236.

At step 236, the process 200 generates, via the one or more multi-microphone devices, first data corresponding to the ambient sound. Accordingly, in some instances the one or more multi-microphone devices 160 may generate the first data corresponding to the ambient sound (sensed at step 232). From step 236, the process 200 goes to (and continues at) step 240.

At step 240, the process 200 receives, via the one or more user devices in the field environment, with each such user device comprising a respective deep neural network comprising a respective predictive audio spectral mask, the first data from the respective one or more multi-microphone devices. Accordingly, in some instances the one or more field environment user devices 166 (each comprising the respective copy of the respective one of the one or more trained deep neural networks comprising the respective predictive audio spectral masks, communicated at step 228) may receive the first data (generated at step 236) from the respective one or more multi-microphone devices 160. From step 240, the process 200 goes to (and continues at) step 244.

At step 244, the process 200 uses the one or more deep neural networks in each respective user device in the field environment (with each of the one or more deep neural networks comprising a respective predictive audio spectral mask) to separate amplitude data and/or phase data from the first data, corresponding to each microphone of each respective multi-microphone device. Accordingly, in some instances the one or more field environment user devices 166 (each comprising the respective copy of the respective one of the one or more trained deep neural networks comprising the respective predictive audio spectral masks, communicated at step 228) may use its trained deep neural network (comprising its respective predictive audio spectral mask) to separate the amplitude data and/or phase data from the first data, corresponding to each microphone of the respective one of the one or more multi-microphone devices 160 to which it is communicatively coupled. It should be appreciated that in some embodiments step 244 may also comprise dereverberation and/or other suitable audio processing of the first data in addition to filtering the first data through the respective predictive audio spectral masks. From step 244, the process 200 goes to (and continues at) step 248.

At step 248, the process 200 uses each of the one or more user devices in the field environment to determine, based on the amplitude data and/or phase data (separated from the first data, at step 244), each respective location of origin of the target speech relative to the location of that respective user device. Accordingly, in some instances each of the one or more field environment user devices 166 may determine, based on the amplitude data and/or phase data, each respective location of origin of the target speech relative that one of the one or more field environment user devices 166. In some embodiments, in which the amplitude data comprises data representing relative signal strengths of the filtered audio from each microphone of the multi-microphone device, such relative signal strengths may be used to determine the direction of the target speech. In some embodiments, in which the phase data represents relative phase angles of the audio sensed by each microphone, such relative phase angles may be used to determine the direction of the target speech. In some embodiments, both the relative signal strengths and the relative phase angles may be used in combination to determine the direction of the target speech. It should be appreciated that in order to ensure that the locations are consistent between the multi-microphone devices and user devices in the field environment (in embodiments where they are separate), it may be necessary either to fix each multi-microphone device to each respective user device in the field environment, or otherwise to have a means of determining their relative locations and/or angles of orientation. One way to determining their relative angles of orientation may be to include a magnetometer, gyro, or other direction-sensing component in each multi-microphone device. Once calibrated, each respective user device in the field environment could then compensate for any difference in orientation between it and the respective multi-microphone device. From step 248, the process 200 goes to (and continues at) step 252.

At step 252, the process 200 uses each of the one or more user devices in the field environment to display each respective location of origin of the target speech relative to the location of that respective user device. Accordingly, in some instances each of the one or more field environment user devices 166 may display one or more indicators of each respective location of origin of the target speech relative to the location of that respective one of the one or more field environment user devices 166.

Figure 3:
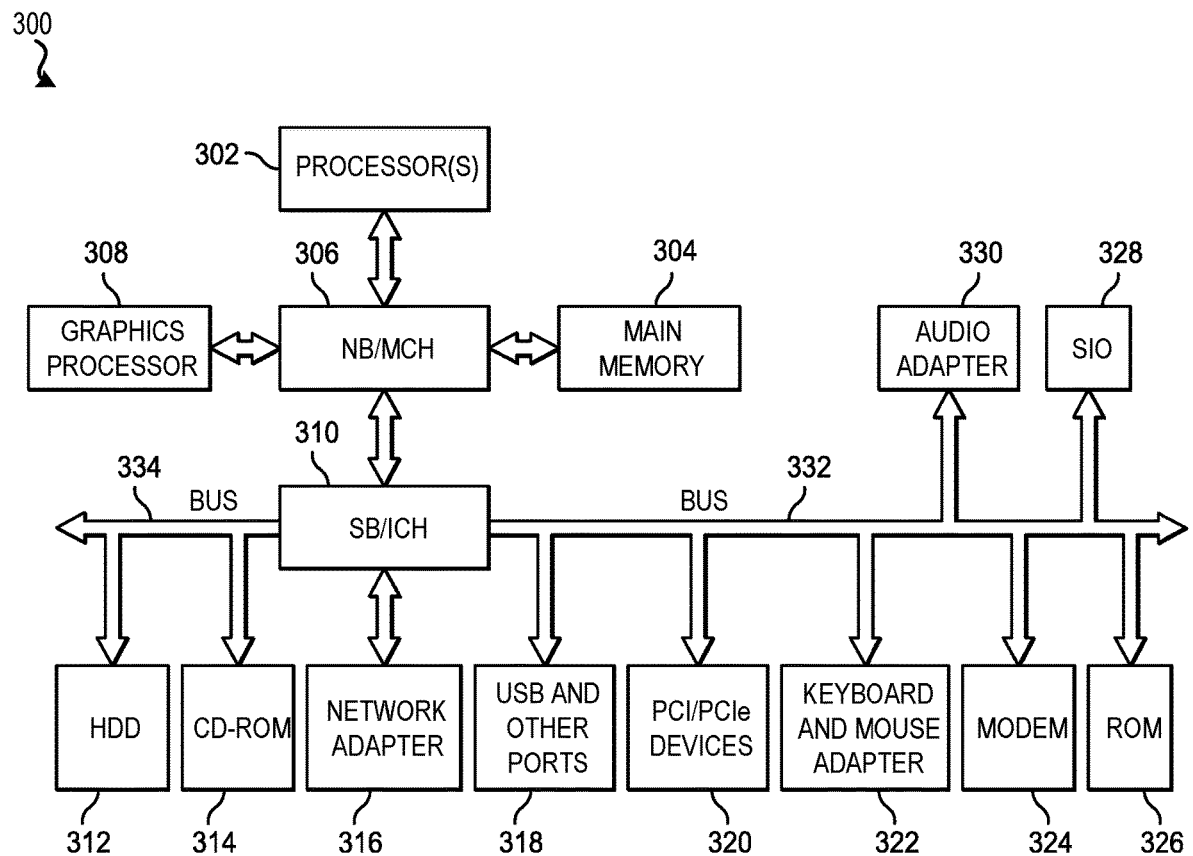
FIG. 3 is a block diagram illustration of a hardware architecture of a data processing system in accordance with aspects of the present disclosure.

FIG. 3 is a block diagram illustration of a hardware architecture of a data processing system 300 in accordance with aspects of the present disclosure. In some embodiments, one or more of the systems and/or components described herein (e.g., the one or more user devices 118, the one or more field environment user devices 166, the one or more remote data storage modules 184, the one or more server devices 178, the network 190, etc.) may be implemented using a corresponding one or more of the data processing system 300. Moreover, the data processing system 300 may be configured to store and execute one or more instructions of the process 200 and/or any other methods and/or processes described herein.

The data processing system 300 employs a hub architecture including north bridge and memory controller hub ("NB/MCH") 306 and south bridge and input/output ("I/O") controller hub ("SB/ICH") 310. Processor(s) 302, main memory 304, and graphics processor 308 are connected to NB/MCH 306. Graphics processor 308 may be connected to NB/MCH 306 through an accelerated graphics port ("AGP"). A computer bus, such as bus 332 or bus 334, may be implemented using any type of communication fabric or architecture that provides for a transfer of data between different components or devices attached to the fabric or architecture.

Network adapter 316 connects to SB/ICH 310. Audio adapter 330, keyboard and mouse adapter 322, modem 324, read-only memory ("ROM") 326, hard disk drive ("HDD") 312, compact disk read-only memory ("CD-ROM") drive 314, universal serial bus ("USB") ports and other communication ports 318, and peripheral component interconnect/peripheral component interconnect express ("PCI/PCIe") devices 320 connect to SB/ICH 310 through bus 332 and bus 334. PCI/PCIe devices may include, for example, Ethernet adapters, add-in cards, and personal computing ("PC") cards for notebook computers. PCI uses a card bus controller, while PCIe does not. ROM 326 may comprise, for example, a flash basic input/output system ("BIOS"). Modem 324 or network adapter 316 may be used to transmit and receive data over a network.

HDD 312 and CD-ROM drive 314 connect to SB/ICH 310 through bus 334. HDD 312 and CD-ROM drive 314 may use, for example, an integrated drive electronics ("IDE") or serial advanced technology attachment ("SATA") interface. In some embodiments, the HDD 312 may be replaced by other forms of data storage devices including, but not limited to, solid-state drives ("SSDs"). A super I/O ("SIO") device 328 may be connected to SB/ICH 310. SIO device 328 may comprise a chip on the motherboard that is configured to assist in performing less demanding controller functions for the SB/ICH 310 such as controlling a printer port, controlling a fan, and/or controlling the small light emitting diodes ("LEDS") of the data processing system 300.

The data processing system 300 may include a single processor 302 or may include a plurality of processors 302. Additionally, processor(s) 302 may have multiple cores. In some embodiments, data processing system 300 may employ a large number of processors 302 that include hundreds or thousands of processor cores. In some embodiments, the processors 302 may be configured to perform a set of coordinated computations in parallel.

An operating system is executed on the data processing system 300 using the processor(s) 302. The operating system coordinates and provides control of various components within the data processing system 300. Various applications and services may run in conjunction with the operating system. Instructions for the operating system, applications, and other data are located on storage devices, such as one or more of the HDD 312, and may be loaded into main memory 304 for execution by processor(s) 302. In some embodiments, additional instructions or data may be stored on one or more external devices. The processes described herein for the illustrative embodiments may be performed by processor(s) 302 using computer usable program code, which may be located in a memory such as, for example, main memory 304, ROM 326, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a location of origin of a target speech implemented by a first user device, comprising:
receiving first data from a first multi-microphone device comprising first ambient sound sensed by the first multi-microphone device at a first location, wherein the first ambient sound comprises a first target speech;
receiving second data from a second multi-microphone device comprising second ambient sound sensed by the second multi-microphone device at a second location, wherein the second ambient sound comprises the first target speech;
separating, from the first data, via a first deep neural network comprising a first predictive audio spectral mask in the first user device, at least one component of the first data selected from the group consisting of amplitude data corresponding to a first amplitude component of the first ambient sound and phase data corresponding to a first phase component of the first ambient sound;
separating, from the second data, via the first deep neural network, at least one component of the second data selected from the group consisting of the amplitude data corresponding to a second amplitude component of the second ambient sound and the phase data corresponding to a second phase component of the second ambient sound;
determining a location of origin of first target speech relative to a location of the first user device based on the at least one component of the first data, the at least one component of the second data, the first location, and the second location; and
displaying, via the first user device, the location of origin of the first target speech relative to the first user device.

2. The method of claim 1, wherein the first user device comprises a mobile device.

3. The method of claim 2, wherein the mobile device comprises a smartphone.

4. The method of claim 1, further comprising:
separating, from the first data, via a second deep neural network, at least one additional component of the first data selected from the group consisting of the amplitude data corresponding to a third amplitude component of the first ambient sound and the phase data corresponding to a third phase component of the first ambient sound;
separating, from the second data, via the second deep neural network, at least one additional component of the second data selected from the group consisting of the amplitude data corresponding to a fourth amplitude component of the second ambient sound and the phase data corresponding to a fourth phase component of the second ambient sound;
determining, via the first user device and based on the at least one additional component of the first data, the at least one additional component of the second data, the first location, and the second location, the location of origin of a second target speech relative to the location of the first user device; and
displaying, via the first user device, the location of origin of the second target speech relative to the first user device.

5. A system, comprising:
a memory having instructions therein; and
at least one processor in communication with the memory, wherein the at least one processor is configured to execute the instructions to:
receive first data from a first multi-microphone device comprising first ambient sound sensed by the first multi-microphone device at a first location, wherein the first ambient sound comprises a first target speech;
receive second data from a second multi-microphone device comprising second ambient sound sensed by the second multi-microphone device at a second location, wherein the second ambient sound comprises the first target speech;
separate, from the first data, via a first deep neural network comprising a first predictive audio spectral mask, at least one component of the first data selected from the group consisting of amplitude data corresponding to a first amplitude component of the first ambient sound and phase data corresponding to a first phase component of the first ambient sound;
separate, from the second data, via the first deep neural network, at least one component of the second data selected from the group consisting of the amplitude data corresponding to a second amplitude component of the second ambient sound and the phase data corresponding to a second phase component of the second ambient sound; and
determine a location of origin of first target speech based on the at least one component of the first data, the at least one component of the second data, the first location, and the second location.

6. The system of claim 5, wherein the at least one processor is configured to execute the instructions to determine the location of origin of the first target speech relative to a location of a first user device.

7. The system of claim 6, wherein the first user device comprises a mobile device.

8. The system of claim 5, wherein the at least one processor is further configured to execute the instructions to:
receive third data from a third multi-microphone device comprising third ambient sound sensed by the third multi-microphone device at a third location;
separate, from the third data, via the first deep neural network, at least one component of the third data selected from the group consisting of the amplitude data corresponding to a third amplitude component of the third ambient sound sensed and phase data corresponding to a third phase component of the third ambient sound; and
determine the location of origin of the first target speech based on the at least one component of the first data, the at least one component of the second data, the at least one component of the third data, the first location, the second location, and the third location.

9. The system of claim 5, wherein the at least one processor is further configured to execute the instructions to cause wireless communication, from a first user device to a second user device, of a copy of the first deep neural network comprising a copy of the first predictive audio spectral mask.

10. The system of claim 5, wherein the at least one processor is further configured to execute the instructions to:
- separate, from the first data, via a second deep neural network comprising a second predictive audio spectral mask, at least one additional component of the first data selected from the group consisting of the amplitude data corresponding to a third amplitude component of the first ambient sound and the phase data corresponding to a third phase component of the first ambient sound;
- separate, from the second data, via the second deep neural network, at least one additional component of the second data selected from the group consisting of the amplitude data corresponding to a fourth amplitude component of the second ambient sound and the phase data corresponding to a fourth phase component of the second ambient sound; and
- determine a location of origin of second target speech based on the at least one additional component of the first data, the at least one additional component of the second data, the first location, and the second location.

11. A computer program product, the computer program product comprising a computer readable storage medium having program instructions embodied therewith, the program instructions executable by at least one processor of a system to cause the system to:
- receive first data from a first multi-microphone device comprising first ambient sound sensed by the first multi-microphone device at a first location, wherein the first ambient sound comprises a first target speech;
- receive second data from a second multi-microphone device comprising second ambient sound sensed by the second multi-microphone device at a second location, wherein the second ambient sound comprises the first target speech;
- separate, from the first data, via a first deep neural network comprising a first predictive audio spectral mask, at least one component of the first data selected from the group consisting of amplitude data corresponding to a first amplitude component of the first ambient sound and phase data corresponding to a first phase component of the first ambient sound;
- separate, from the second data, via the first deep neural network, at least one component of the second data selected from the group consisting of the amplitude data corresponding to a second amplitude component of the second ambient sound and the phase data corresponding to a second phase component of the second ambient sound; and
- determine a location of origin of first target speech based on the at least one component of the first data, the at least one component of the second data, the first location, and the second location.

12. The computer program product of claim 11, wherein the program instructions are further executable by the at least one processor to cause the system to determine the location of origin of the first target speech relative to a location of a first user device.

13. The computer program product of claim 12, wherein the first user device comprises a mobile device.

14. The computer program product of claim 11, wherein the program instructions are further executable by the at least one processor to cause the system to:
- receive third data from a third multi-microphone device comprising third ambient sound sensed by the third multi-microphone device at a third location;
- separate, from the third data, via the first deep neural network, at least one component of the third data selected from the group consisting of the amplitude data corresponding to a third amplitude component of the third ambient sound sensed and phase data corresponding to a third phase component of the third ambient sound; and
- determine the location of origin of the first target speech based on the at least one component of the first data, the at least one component of the second data, the at least one component of the third data, the first location, the second location, and the third location.

15. The computer program product of claim 11, wherein the program instructions are further executable by the at least one processor to cause the system to cause wireless communication, from a first user device to a second user device, of a copy of the first deep neural network comprising a copy of the first predictive audio spectral mask.

16. The computer program product of claim 11, wherein the program instructions are further executable by the at least one processor to cause the system to:
- separate, from the first data, via a second deep neural network comprising a second predictive audio spectral mask, at least one additional component of the first data selected from the group consisting of the amplitude data corresponding to a third amplitude component of the first ambient sound and the phase data corresponding to a third phase component of the first ambient sound;
- separate, from the second data, via the second deep neural network, at least one additional component of the second data selected from the group consisting of the amplitude data corresponding to a fourth amplitude component of the second ambient sound and the phase data corresponding to a fourth phase component of the second ambient sound; and
- determine a location of origin of second target speech based on the at least one additional component of the first data, the at least one additional component of the second data, the first location, and the second location.

17. The method of claim 1, further comprising training the first predictive audio spectral mask to separate speech data of the first target speech from the first ambient sound using the first target speech.

18. The system of claim 5, wherein the at least one processor is further configured to execute the instructions to train the first predictive audio spectral mask to separate speech data of the first target speech from the first ambient sound using the first target speech.

19. The computer program product of claim 11, wherein the program instructions are further executable by the at least one processor to cause the system to train the first predictive audio spectral mask to separate speech data of the first target speech from the first ambient sound using the first target speech.

* * * * *